United States Patent [19]

White

[11] Patent Number: 4,495,135
[45] Date of Patent: Jan. 22, 1985

[54] METHOD FOR FORMING CONTAINER HAVING RE-ENTRANT FLANGE

[75] Inventor: Leonard A. White, Gurnee, Ill.

[73] Assignee: Baxter Travenol Laboratories, Inc., Deerfield, Ill.

[21] Appl. No.: 406,374

[22] Filed: Aug. 9, 1982

[51] Int. Cl.³ .................................................. B29C 17/04
[52] U.S. Cl. .................................. 264/553; 264/318; 264/544; 425/388
[58] Field of Search ............... 264/544, 547, 548, 549, 264/551, 553, 318; 425/387.1, 388, 441–443, DIG. 58; 220/74; 206/519

[56] References Cited

U.S. PATENT DOCUMENTS

| | | | |
|---|---|---|---|
| 2,335,260 | 11/1943 | Chamberlain | 220/74 |
| 2,962,758 | 12/1960 | Politis | 264/551 |
| 3,058,153 | 10/1962 | Busch | 425/253 |
| 3,126,582 | 3/1964 | Scott | 425/388 |
| 3,235,165 | 2/1966 | Jackson | 206/633 |
| 3,394,861 | 7/1968 | Truax | 229/15 |
| 3,640,668 | 2/1972 | Brown et al. | 425/161 |
| 3,749,276 | 7/1973 | Davis | 206/519 X |
| 4,101,256 | 7/1978 | White et al. | 425/441 |
| 4,123,495 | 10/1978 | Abey | 264/318 |

FOREIGN PATENT DOCUMENTS

| | | | |
|---|---|---|---|
| 281844 | 12/1965 | Australia | 264/550 |
| 926320 | 5/1973 | Canada | 220/74 |
| 1053927 | 1/1967 | United Kingdom | 425/388 |

Primary Examiner—Jan Silbaugh
Attorney, Agent, or Firm—Robert M. Barrett; Paul C. Flattery; John P. Kirby, Jr.

[57] ABSTRACT

A unitary, thermoformed container having an undercut or re-entrant seal flange is provided. The container is made in a molding method and apparatus in which a flange-forming portion thereof has a short-stroke gate assembly that opens after the unitary, thermoformed container has been formed in order to provide an exit path away from the molding cavity to permit ready removal of the thermoformed container out of the molding cavity and its flange-forming portion.

5 Claims, 12 Drawing Figures

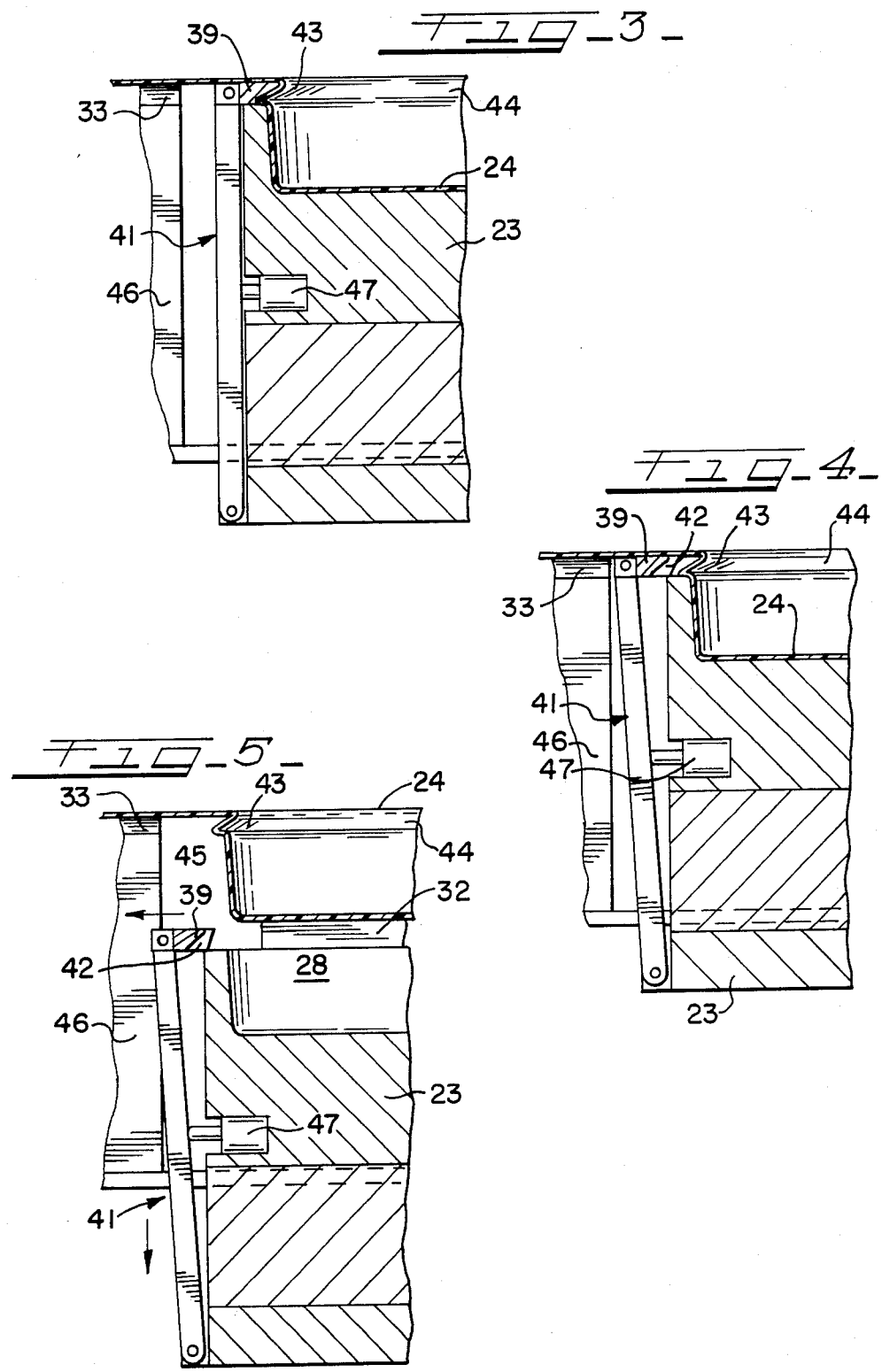

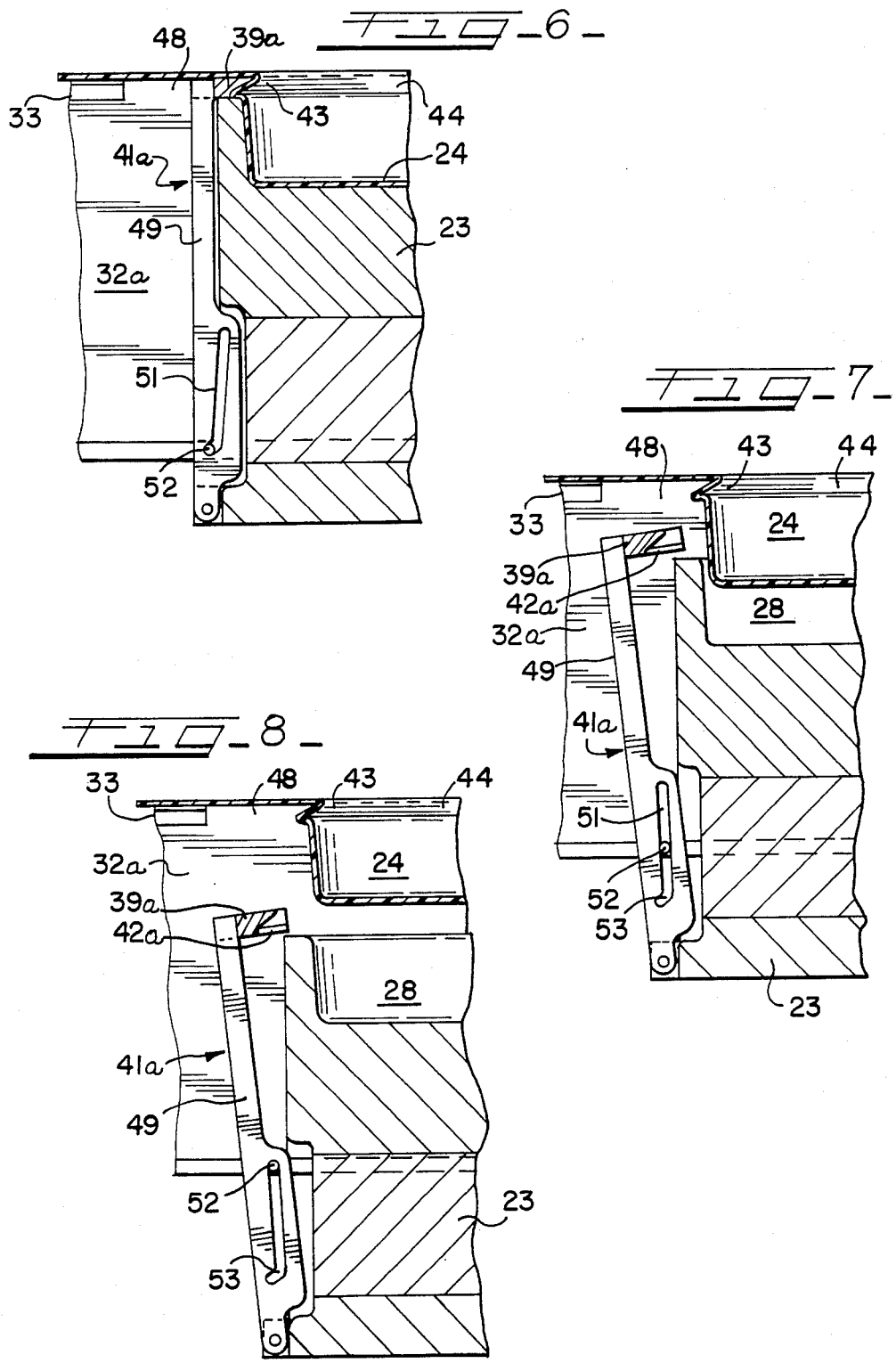

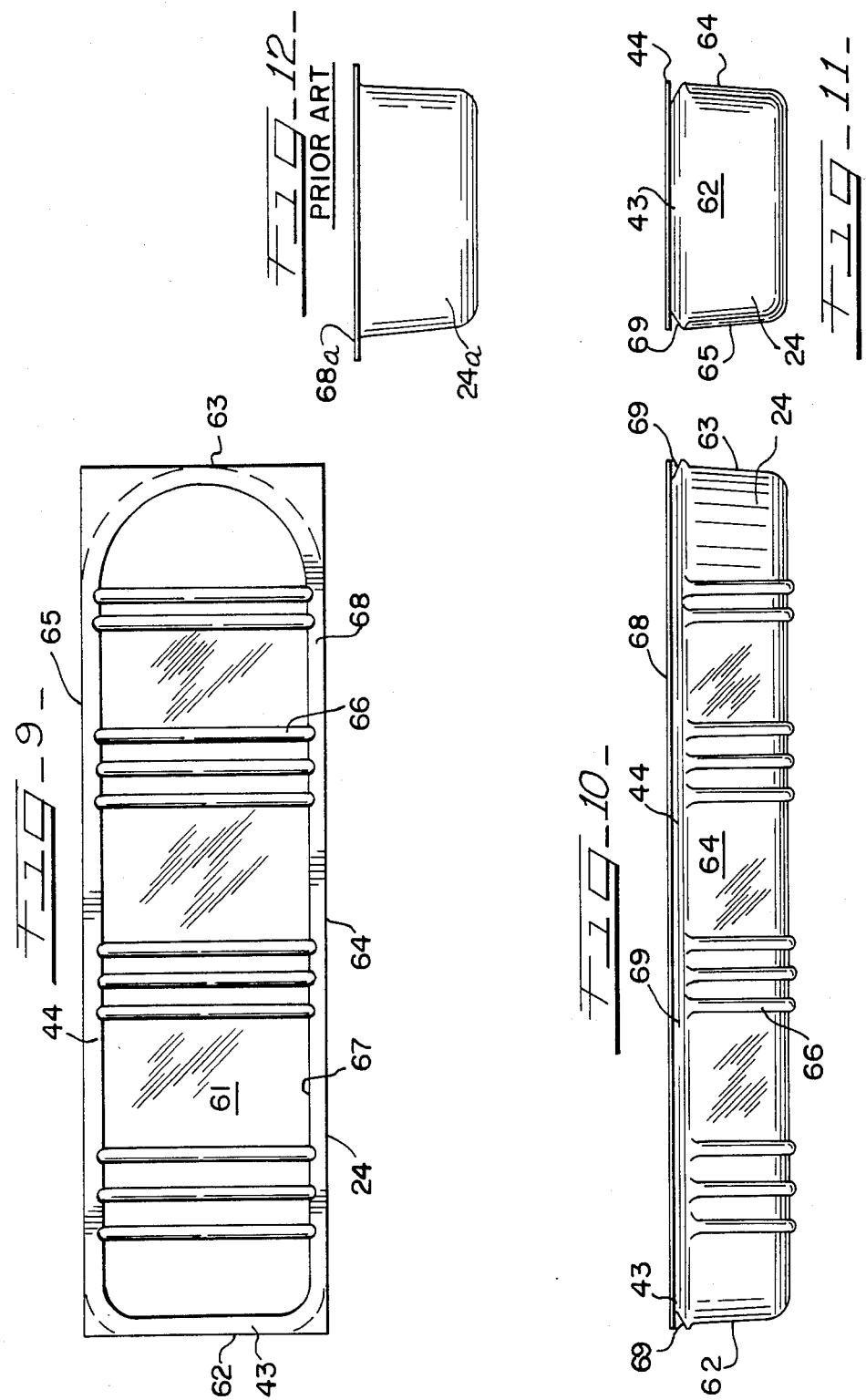

METHOD FOR FORMING CONTAINER HAVING RE-ENTRANT FLANGE

BACKGROUND AND DESCRIPTION OF THE INVENTION

This invention generally relates to a unitary container member and to a method and apparatus for molding same. More particularly, the present invention relates to a container member having an undercut or re-entrant sealing flange integrally formed with the body portion of the container member in order to provide a container member that has a sealing flange which does not project substantially beyond the external dimensions of the container member, and the container member is formed by a thermoforming molding apparatus according to this invention that includes a short-stroke gate in the flange-forming portion thereof, which gate breaks away for ready removal of the thermoformed container member, and particularly its undercut flange, from the molding apparatus.

Packaging assemblies such as the so-called blister packs that are in wide use today often include container members to which an end closure member or lid sheet is sealed onto a sealing lip of the container member after the product being packaged is inserted into the container member. These types of container members are typically made on molding machines such as those of the form-fill-seal type that include dies which thermoform sheets of rollstock into webs having a plurality of container members. Within such dies, a web of rollstock is heated to form a container member, the forming operation typically including vacuum pulling or air pressure formation of the heated rollstock web to the interior configuration of the dies, often an upper and lower die that define the mold cavity. After the container member is suitably formed within the mold cavity, the mold cavity is opened, usually by downward movement of the lower die member until it clears the bottom of the thermoformed container member, after which the thermoformed container member moves out of the molding cavity for subsequent processing or use.

At this stage, the container members remain in web form for ease of subsequent operations such as filling, sealing and the like, during which multiple container members of the web are subjected to such additional operations whereupon such operations are carried out simultaneously on the multiple container members of the web. While this feature of being able to carry out an operation simultaneously on multiple containers of the web enjoys numerous advantages of speed, efficiency and consistency, the molding of the container members must be carried out in such a manner that the container members can be removed from the molding cavity without dividing up or otherwise damaging the web. For example, it is typically required that the upper and lower die members of the molding cavity must be structured such that the container members formed in the web readily break loose of and clear the internal molding surfaces of the die members as the lower die drops with respect to the upper die. Generally speaking, this requirement is met when web-joined container members have side walls that include no undercut or re-entrant surface features that project inwardly with respect to the individual container members, it being understood that these side walls are the walls of the container member that lie along the direction of typically downward movement of the lower die member.

As a result, container members formed in this manner typically cannot have side walls that include internally projecting surface portions of any substantial length, such as undercut sealing flanges. Undercuts of some length and of certain configurations can sometimes be formed in the side walls of these types of containers by the use of retractable cores, resilient molding disks, retractable rods, angle pins, sliding blocks and the like. Moreover, these types of molding devices typically require significant separation of adjacent cavities or long-stroke operations, which can lead to substantial wastage of rollstock material.

Because of the limitations with respect to having substantial portions of the side walls or extensions thereof project inwardly, heretofore the sealing lip of these container members has been positioned to lie generally outside of or external to the side walls of the container member. The composite packaging assembly utilizing these container members includes a lip that projects well outside of or beyond the periphery of the side walls of the container member. Such packaging assemblies have an outside dimension that is far in excess of that actually needed to containerize the product being packaged, which increases the shipping and storage size of the packaging assembly. Also, since there is substantially no re-entrant or inwardly projecting portion of such conventional sealing lip structures, the side walls are virtually free of horizontal creases and are of no assistance in containment of the product within the packaging assembly or within the container member prior to sealing the closure lid thereto.

By the present invention, a container member is provided with a peripheral sealing flange that is undercut such that the sealing flange does not appreciably extend, in a direction away from the center of the container member, beyond the outermost perimeter of side walls of the container member. The sealing flange of the product aspect of this invention includes an undercut section that projects generally inwardly of the container member, which structure reduces the shipping and storage size of the container member while also providing an inwardly projecting surface that assists in retaining the product while it is being packaged and while it is being opened, especially when the product includes elongated resilient portions that must be folded upon themselves, such as tubing and the like. Containers having sealing flanges according to this invention tend to have improved stacking strength, and they also conserve rollstock materials in that it is possible to form additional container members for a given area of rollstock inasmuch as the container members can be formed at locations on the web that are more closely spaced from each other than when the sealing flanges project beyond the side walls of the container member.

The container member according to this invention is a unitary container member in which its body portion is integrally formed with its sealing flange and lip, the flange including a section that is undercut or re-entrant with respect to the side walls of the container member. Such a container member is formed by an improved thermoforming method and apparatus which provide a molding cavity that includes the use of a short-stroke gate assembly to define part of its flange-forming portion, which gate assembly opens to afford a generally unobstructed passageway out of the molding cavity in the leading direction, which is the direction that the web moves through the thermoforming apparatus, or the upstream direction.

Accordingly, it is a general object of this invention to provide an improved container member for a packaging assembly.

Another object of the present invention is to provide an improved container member having a re-entrant sealing flange, as well as the method and apparatus for molding same.

Another object of this invention is to provide an improved product that is thermoformed from a web of rollstock while forming side walls thereof that have generally internally projecting portions.

Another object of the present invention is to provide an improved product and an improved apparatus and method for making same which reduces the shipping and storage size of a container having a given volume.

A further object of this invention is to provide an improved product, and an improved apparatus and method for making same which includes a peripheral flange at the mouth thereof which has a re-entrant configuration that assists in retaining products within the container member.

Another object of this invention is to provide an improved thermoforming apparatus and method that selectively provides a clear pathway out of the molding cavity thereof in the upstream direction of movement of the leading edge of the web of stock material being thermoformed.

Another object of this invention is to provide an improved thermoforming method and apparatus that minimizes the area of rollstock that lies between container members thermoformed thereby.

Another object of this invention is to provide an improved thermoforming method and apparatus that utilizes a short-stroke gate assembly.

These and other objects of the present invention will become apparent from the following detailed description and drawings, wherein:

FIG. 3 is a sectional view, partially broken away, generally along the line 3—3 of FIG. 1 and illustrating an embodiment of the short-stroke gate assembly of the apparatus according to this invention;

FIG. 4 is a sectional view of the embodiment illustrated in FIG. 3 wherein the gate assembly is opened;

FIG. 5 is a sectional view of the embodiment illustrated in FIG. 3 wherein the gate assembly is opened and the lower molding die member has been lowered to be clear of the container member;

FIG. 6 is a sectional view having an orientation the same as FIG. 3, illustrating an alternative embodiment;

FIG. 7 is a sectional view illustrating the embodiment of FIG. 6 wherein this short-stroke gate member is opened;

FIG. 8 is a sectional view of the embodiment of FIG. 6 in which the gate member is opened and the lower molding die member is lowered to be clear of the container member;

FIG. 9 is a top plan view of the container member according to this invention;

FIG. 10 is a side elevational view of the container member illustrated in FIG. 9;

FIG. 11 is an end elevational view of the container member illustrated in FIG. 9; and FIG. 12 is an end elevational view of a prior art container member.

Figures 1, 2:
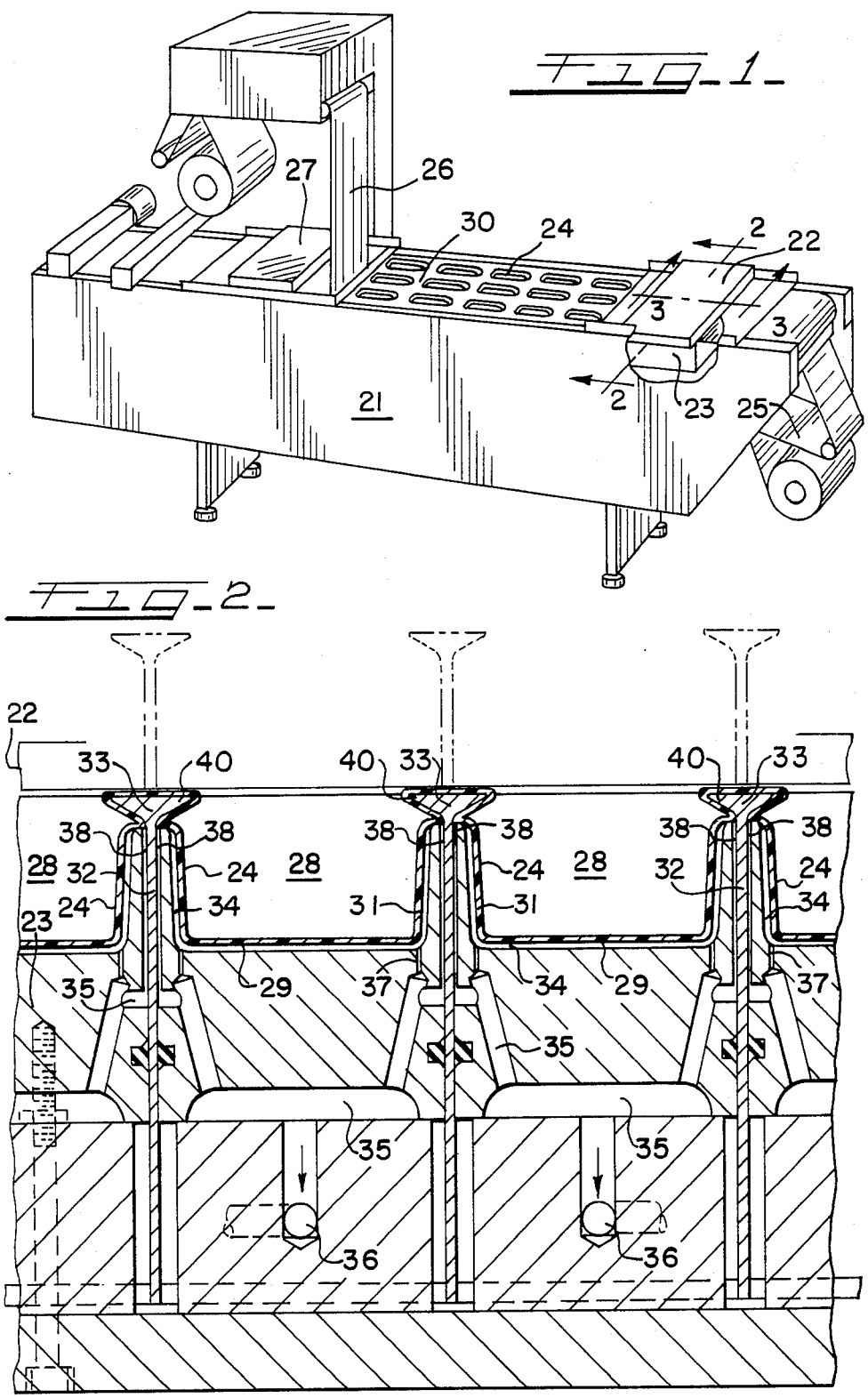
FIG. 1 is a perspective view illustrating the principal features of a thermoforming apparatus.
FIG. 2 is a cross-sectional view along the line 2—2 of FIG. 1 illustrating details of the molding cavity according to this invention.

A thermoforming apparatus, which is generally illustrated in FIG. 1 by reference numeral 21, includes an upper die member 22 and a lower die member 23 for forming container members 24 within a web 25 of rollstock thermoformable material. Downstream of the die members 22 and 23, a web of closure member material 26 is positioned over the web 30 of joined container members 24, after which the web 26 is, at a sealing station 27, sealed over the web 30 such that each container member 24 has a closure member or lid sealed over its mouth portion 60.

With more particular reference to the lower die member 23, and referring particularly to FIG. 2, the lower die member 23 includes a plurality of molding cavities 28. Cavities 28 are defined at the top by upper die member 22 and at the bottom by bottom cavity walls 29. The sides of molding cavities 28 are defined by side cavity walls 31 and by eject bars 32, primarily by their flange-forming portions 33, which are preferably generally T-shaped as illustrated. Molding cavities 28 may also include rib-forming indents 34.

Lower die member 23 further includes vacuum manifolding 35 of conventional construction which is in communication with a vacuum supply means (not shown) through conduits 36. Vacuum manifolding 35 includes narrow passageways 37 opening into the molding cavities 28, including passageways 38 that open into the molding cavities 28 at locations where the eject bars 32 protrude through the lower die member 23. These latter passageways 38 are useful in assisting the desired thermoforming of the web 25 to a configuration that is in general conformity with the flange-forming portions 33.

With reference to the embodiment illustrated in FIGS. 3, 4 and 5, the leading end 39 of the flange-forming portion 33 is part of a short-stroke gate assembly, generally designated as 41. This leading end 39 of the flange-forming portion 33 is generally C-shaped in horizontal cross-section in that it includes arms 42 that "wrap-around" so as to form the leading portion 43 of the flange 44 of the container member 24. Such leading portion 43 should extend to include those portions at the leading end of the container member which are narrower than the overall width of the container member 24, for example, any rounded, angled or tapered leading-end corners thereof.

After the container member 23 is formed as illustrated in FIG. 3, the gate assembly 41 is activated to move its leading end 39 out of contact with the leading portion 43 of the container member flange 44, such movement being in the leading or upstream direction. In this embodiment, this movement is facilitated by providing a gap 45 between the eject bars 32 and rails 46, which typically have a structure substantially the same as the eject bars 32. Rails 46 provide support and guidance for the web 30 of container members as it passes between the die members 22, 23 and the sealing station 27. This movement of the leading end 39 of the gate assembly 41 out of engagement with the leading portion 43 of the container member 24 can be carried out by an activation means 47, such as the piston and cylinder illustrated, or by other suitable mechanisms such as solenoids, rotating shafts, cams, and the like.

Referring to FIG. 5, after the leading end 39 clears the leading portion 43 of the container member 24, the leading end 39 is lowered to a location generally below that of the bottom wall of the container member 24 so that movement of the web 30 of container members in the leading or upstream direction will not be interfered with by the leading end 39 of the gate assembly 41. Preferably, this lowering of the gate assembly 41 is accomplished simultaneously with the lowering of the lower die member 23 in order to remove each container member 24 from the remainder of the molding cavity 28, including the body-forming portion, comprised of the side cavity wall 31 and the bottom cavity wall 29, as well as the rest or trailing portion of the flange-forming portion 33. Such can be accomplished by securing the gate assembly 41 to the lower die member 23 as illustrated.

Once the container member 24 has moved upstream beyond the gate assembly 41, the gate assembly 41 and typically also the lower die member 23 are raised to the height illustrated in FIG. 3, and the leading end 39 is returned to its orientation illustrated in FIG. 3, at which stage the lower die member 23 is ready for formation of another container member 24 therewithin.

FIGS. 6, 7 and 8 illustrate the sequence of operations shown in FIGS. 3, 4 and 5, respectively, for another embodiment of this invention. In this embodiment, there is a gap in the eject bars/rails 32a, which is an indent or gap 48 within the flange-forming portion 33 thereof. By this structure, the web 30 of container members continues to be supported by the eject bars/rails 32a even in the vicinity of the indent or gap 48. Preferably, this indent or gap 48 is defined by the absence of the T-projections 40 which form part of the flange-forming portion 33.

Another feature of this embodiment is the short-stroke gate assembly 41a which opens automatically when the lower die member 23 is lowered and which closes automatically when the lower die member 23 is raised. Gate assembly 41a includes leading end 39a having wrap-around arms 42a, which leading end 39a is connected to a support member such as the illustrated lever arm 49 rotatably mounted to the lower die member 23. Lever arm 49 includes a cam track 51 for receiving a stationary pin 52. The cam track 51 and the pin 52 cooperate to move leading end 39a in the leading or upstream direction when the lower die member 23 begins its downward movement away from its molding position.

Such movement is accomplished in the illustrated structure by providing an offset track section 53 in the cam track 51, which offset track section 53 has a minimal length to enhance the short-stroke properties of the gate assembly 41a. This minimum length is one that is adequate to have the wrap-around arms 42a break free of the leading portion 43 of the container member 24, whether by complete clearance or by less than total clearance combined with limited flexibility of the leading portion 43. The cam track 51 has a length that is adequate to accommodate the extent of movement of the lower die member 23.

With more particular reference to the container member 24 illustrated in FIGS. 9, 10 and 11, same has a bottom wall 61, a leading end wall 62, a trailing end wall 63 and side walls 64, 65 that are integral with the end walls 62 and 63 and the bottom wall 61. The flange 44, including its leading portion 43, is also integral with the rest of the container member 24 including the end walls 62 and 63 and the side walls 64 and 65. One or more rib members 66 can be included as shown in order to enhance the strength and rigidity of the container member 24.

Referring particularly to the flange 44, it is integral with the perimeter 67 of the opening or mouth portion 60 of the container member 24. Flange 44 includes an external sealing lip 68, the outside perimeter of which is generally no larger than the outside perimeter of the body of the container member 24 as defined by the end walls 62 and 63 and the side walls 64 and 65. It is often desirable, as illustrated, that this outside perimeter of the sealing lip 28 is generally flush with such perimeter of the container member body.

This placement of the sealing lip 68 with respect to the body of the container member 24 is accomplished by imparting a re-entrant condition to the flange 44 by including an undercut section 69 of the flange 44, which undercut section 69 is located between the sealing lip 68 and the integral and unitary body of the container member 24 formed by the end walls 62 and 63 and the side walls 64 and 65.

The web of rollstock 25 and the container members 24 molded therefrom may be of any thermoformable material, including those that are semi-rigid or rigid. Such materials need not be exceptionally flexible because the short-stroke gate assembly of this invention frees the container members 24 from the molding cavities 28 without the need of substantial flexure of the flange 44. For example, suitable materials include those having a flex modulus of 100,000 and above and include polyvinyl chloride, styrene polymers, acrylics and the like.

FIG. 12 illustrates a typical prior art container member 24a which has a sealing lip 68a having an outer perimeter that extends well beyond the mouth and the body side walls of the container member 24a, there being provided no re-entrant flange or undercut section of its side or end walls that project inwardly with respect to this container member 24a.

It is to be appreciated that this invention can be embodied in various forms, and therefore is to be construed and limited only by the scope of the appended claims.

What is claimed is:

1. A short-stroke method for forming thermoformed unitary container members having an undercut flange, comprising the steps of:

longitudinally moving a web of thermoformable material over an undercut flange-forming member along the periphery of a thermoforming molding cavity, the undercut flange-forming member having a movable leading end that is at the upstream end of the molding cavity, the upstream end being defined by the direction of said longitudinal movement of the web, the undercut flange-forming member having a stationary trailing end that is downstream of the leading end of the flange-forming member;

thermoforming a unitary container member within the molding cavity by thermoforming a portion of the web over the flange-forming member and into a body-forming member of the molding cavity, said unitary container member having a body, said container member body having a flange along the periphery of the walls of the container member body;

said thermoforming step including imparting a re-entrant condition to the flange so as to form an undercut portion while thermoforming said body and said flange from the web of thermoformable material, said step of imparting a re-entrant condition including drawing the thermoformable material over the undercut flange-forming member;

opening the leading end of the molding cavity flange-forming member by moving same through a short-stroke in said upstream direction away from the molding cavity and by moving same away from the trailing portion of the flange-forming member;

separating the body-forming member and the leading end of the flange-forming member from the rest of the molding cavity until the body-forming member of the molding cavity and the leading end of the flange-forming member clear the container member body;

slidingly moving the web and the container member formed therein in the upstream direction and away from the molding cavity until the container member is completely removed from the molding cavity; and closing the leading end of the molding cavity flange-forming member through a short-stroke in a downstream direction until the leading end operatively engages the trailing portion of the flange-forming member.

2. The method of claim 1, wherein said step of imparting a re-entrant condition to the flange imparts said re-entrant condition to substantially the entire periphery of the container member body.

3. The method of claim 1, wherein said step of imparting a re-entrant condition to the flange forms a flange lip that has an outer periphery that is flush with or inside of the periphery of the walls of the container member body.

4. The method of claim 1, wherein said closing step includes butting the leading end of the flange-forming member up against the trailing portion of the flange-forming member.

5. The method of claim 1, wherein said step of opening of the leading end of the flange-forming member is simultaneous with and automatically carried out in conjunction with said step of separating the molding cavity.

* * * * *